(12) United States Patent
Fukushima

(10) Patent No.: US 11,698,434 B2
(45) Date of Patent: Jul. 11, 2023

(54) MACHINE CONTROL DEVICE

(71) Applicant: FANUC CORPORATION, Yamanashi (JP)

(72) Inventor: Tomonori Fukushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 440 days.

(21) Appl. No.: 16/733,403

(22) Filed: Jan. 3, 2020

(65) Prior Publication Data
US 2020/0249309 A1 Aug. 6, 2020

(30) Foreign Application Priority Data

Feb. 5, 2019 (JP) .................................. 2019-018744

(51) Int. Cl.
G01S 5/02 (2010.01)
B25J 9/16 (2006.01)
(Continued)

(52) U.S. Cl.
CPC ............. G01S 5/021 (2013.01); B25J 9/1697 (2013.01); G01B 11/005 (2013.01); G01B 11/14 (2013.01)

(58) Field of Classification Search
CPC . G01S 5/021; G01S 5/16; B25J 9/1697; B25J 9/16; G01B 11/005; G01B 11/14;
(Continued)

(56) References Cited

U.S. PATENT DOCUMENTS 5,319,443 A * 6/1994 Watanabe ............... G01B 11/00
356/375
2015/0370242 A1* 12/2015 Takeno ................. G05B 19/404
(Continued)

FOREIGN PATENT DOCUMENTS

JP 2889011 5/1999

OTHER PUBLICATIONS

Huisi Miao et al. "An Improved Method of Gray-Code with Binocular Vision for Workpiece 3D Measurement", Jul. 4-8, 2018, 13th World Congress on Intelligent Control and Automation, Changsha, China. (Year: 2018).*

(Continued)

Primary Examiner — Catherine T. Rastovski
Assistant Examiner — Lal C Mang
(74) Attorney, Agent, or Firm — Wenderoth, Lind & Ponack, L.L.P.

(57) ABSTRACT

A machine control device includes an imaging control unit that controls an imaging device to capture two images at two different imaging positions; an imaging position information acquiring unit that acquires positional information of two imaging positions; a measurement distance restoring unit that restores a measurement distance of an object based on two images, distance information between two imaging positions, and a parameter of the imaging device, by using a stereo camera method; a measurement precision calculating unit that calculates a measurement precision of the measurement distance of the object based on two images, the distance information between two imaging positions, and the parameter of the imaging device; an area specifying unit that specifies a partial area of the object as a specified area; and a measurement precision determining unit that determines whether the measurement precision of the object satisfies a predetermined precision in the specified area.

6 Claims, 4 Drawing Sheets

(51) Int. Cl.
*G01B 11/00* (2006.01)
*G01B 11/14* (2006.01)

(58) Field of Classification Search
CPC ............... G01B 11/002; G01C 3/14; G05B 2219/50064; G05B 2219/37042; G05B 2219/45136; G05B 19/401; G05B 19/19; G05B 19/4155; B23Q 15/22
See application file for complete search history.

(56) References Cited

U.S. PATENT DOCUMENTS

2016/0086322 A1* 3/2016 Arita ................. G06T 7/003
2016/0210735 A1* 7/2016 Fukushima ............ G06T 7/004

OTHER PUBLICATIONS

Shiping Zhu et al. "Noncontact 3-D Coordinate Measurement of Cross-Cutting Feature Points on the Surface of a Large-Scale Workpiece Based on the Machine Vision Method", Jul. 2010, IEEE Transactions On Instrumentation and Measurement. (Year: 2010).*

* cited by examiner

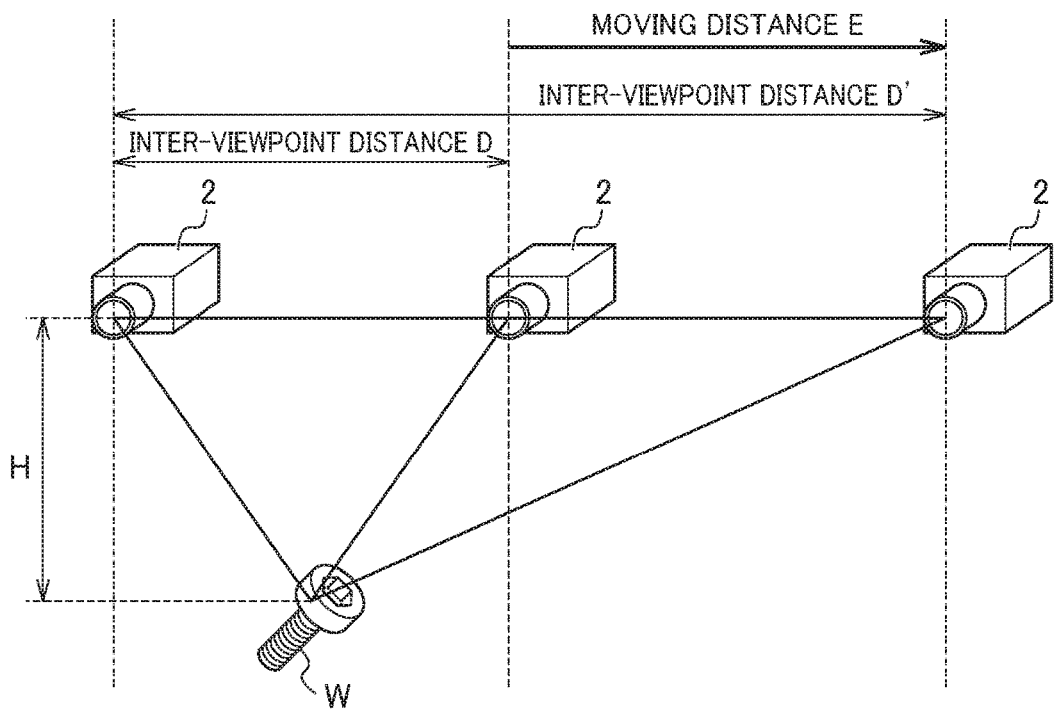

N10 G800 X#200 Y#201 Z#202;          MOVING CAMERA (INITIAL VALUE AT FIRST TIME)

G810;                                 START IMAGING AND IMAGE PROCESSING (MEASURE POSITIONAL INFORMATION AND PRECISION INFORMATION)

G820;                                 SPECIFY PIXEL OF INTEREST (USER INPUT, FEATURE POINT EXTRACTION ALGORITHM, ETC.)

G830 X#100 Y#101 U0.1 V0.1 W0.1;      DETERMINE WHETHER PIXEL (#100, #101) SATISFIES (0.1, 0.1, 0.1) MM PRECISION

IF [#8998 EQ 0] GOTO 90;              IN CASE OF PRECISION BEING INSUFFICIENT

G840 X#100 Y#101 U0.1 V0.1 W0.1;      CALCULATE IMAGING POSITION REQUIRED FOR TARGET PIXEL SATISFYING SPECIFIED PRECISION

#200 = #300; #201 = #301; #202 = #302;  RECEIVE RESULT AND UPDATE MOVING AMOUNT

GOTO 10;                              MOVE ONCE AGAIN AND CAPTURE IMAGE

N10 G810;                     START IMAGING AND IMAGE PROCESSING (MEASURE POSITIONAL INFORMATION AND PRECISION INFORMATION)

G820;                         SPECIFY PIXEL OF INTEREST (USER INPUT, FEATURE POINT EXTRACTION ALGORITHM, ETC.)

G830 X#100 Y#101 U0.1 V0.1 W0.1;   DETERMINE WHETHER PIXEL (#100, #101) SATISFIES (0.1, 0.1, 0.1) MM PRECISION

If [#8998 EQ 0] GOTO 90;      IN CASE OF PRECISION BEING INSUFFICIENT

G800 X#200;                   MOVE CAMERA

GOTO 10;                      CAPTURE IMAGE ONCE AGAIN

N90 M30;
```

MACHINE CONTROL DEVICE

This application is based on and claims the benefit of priority from Japanese Patent Application No. 2019-018744, filed on 5 Feb. 2019, the content of which is incorporated herein by reference.

BACKGROUND OF THE INVENTION

Field of the Invention

The present invention relates to a machine control device that controls machine tools or machines such as industrial robots.

Related Art

For example, there is a numerical control device of a machine tool that performs machining (predetermined processing) such as cutting on a workpiece (object) by using a tool. In such a numerical control device, when controlling the relative position between the tool and the workpiece, it is expected to use information of the position and orientation of the workpiece based on an image of the workpiece taken by a vision sensor (imaging device) (for example, refer to Japanese Patent No. 2889011).

Patent Document 1: Japanese Patent No. 2889011

SUMMARY OF THE INVENTION

Compared to the machining precision of the numerical control device of the machine tool, the measurement precision of the vision sensor is low. Therefore, if the information of the position and orientation of the workpiece based on the image of the workpiece imaged by the vision sensor is used for positioning of the workpiece without considering the measurement precision of the vision sensor, collision between the tool and the workpiece may occur, and the tool or the workpiece may be damaged.

It is an object of the present invention to provide a machine control device for enhancing safety in a machine control device for controlling a machine based on an image of an object imaged by an imaging device.

A first aspect of a machine control device according to the present invention is a machine control device (for example, a machine control device 10 described later) that controls a machine performing a predetermined operation on an object (for example, a work W described later), the machine control device being configured to control a relative position of the machine and the object based on an image including the object imaged by an imaging device (for example, a vision sensor 2 described later), the machine control device including: an imaging control unit (for example, an imaging control unit 11 described later) that controls a position and orientation of the imaging device, and controls the imaging device to capture two or more images including the object at two or more different imaging positions based on a control command; an imaging position information acquiring unit (for example, an imaging position information acquiring unit 13) that acquires positional information of the two or more imaging positions; a measurement distance restoring unit (for example, a measurement distance restoring unit 14) that restores a measurement distance of the object as positional information of the object based on at least two images among the two or more images, distance information between at least two imaging positions corresponding to the at least two images among the two or more imaging positions, and a parameter of the imaging device, by using a stereo camera method; a measurement precision calculating unit (for example, a measurement precision calculating unit 15) that calculates a measurement precision of the measurement distance of the object based on the at least two images, the distance information between the at least two imaging positions, and the parameter of the imaging device; an area specifying unit (for example, an area specifying unit 12) that specifies a partial area of the object as a specified area; and a measurement precision determining unit (for example, a measurement precision determining unit 16) that determines whether the measurement precision of the object satisfies a predetermined precision in the specified area.

According to a second aspect of the present invention, in the machine control device as described in the first aspect, the measurement distance restoring unit may obtain parallax information Z for each pixel by performing area matching on the at least two images, and may calculate a measurement distance H of the object by equation (1) below based on the parallax information Z for the each pixel, distance information between the at least two imaging positions D, and a focal distance f which is the parameter of the imaging device, and the measurement precision calculating unit (15) may calculate a measurement precision P of the measurement distance of the object by equation (2) below, which calculates a difference of the measurement distance H from an adjacent pixel by differentiating the measurement distance H by the parallax information Z, $$H = D \times f / Z \qquad (1),$$

$$P = |dH/dZ| = D \times f/Z^2 = H^2/(D \times f) \qquad (2).$$

According to a third aspect of the present invention, the machine control device as described in the first aspect or the second aspect may stop control of the machine when the measurement precision of the object (W) does not satisfy the predetermined precision.

According to a fourth aspect of the present invention, the machine control device as described in the first aspect or the second aspect, when the measurement precision of the object does not satisfy the predetermined precision, the machine control device may control the position and orientation of the imaging device and changes at least one of the at least two imaging positions so as to enhance the measurement precision of the object.

According to a fifth aspect of the present invention, the machine control device as described in the fourth aspect may control the position of the imaging device in a direction increasing a distance between the at least two imaging positions or in a direction bringing the imaging position close to the object to thereby enhance the measurement precision of the object when the measurement precision of the object does not satisfy the predetermined precision.

According to a sixth aspect of the present invention, the machine control device as described in the fourth aspect or the fifth aspect may further include a predetermined precision position calculating unit (for example, a predetermined precision position calculating unit 17) that calculates distance information between the at least two imaging positions at which the measurement precision of the object satisfies a predetermined precision based on the at least two images, the measurement distance of the object, and the parameter of the imaging device, or calculates a measurement distance of the object at which the measurement precision of the object satisfies a predetermined precision based on the at least two images, the distance information between the at least two imaging positions, and the parameter of the imaging device in the specified area, in which the machine control device may control the position and orientation of the imaging device based on the distance information between the at least two imaging positions or the measurement distance of the object calculated by the predetermined precision position calculating unit, and may change at least one of the at least two imaging positions.

According to a seventh aspect of the present invention, in the machine control device as described in the sixth aspect, the measurement distance restoring unit may obtain parallax information Z for each pixel by performing area matching on the at least two images, and may calculate a measurement distance H of the object by equation (1) below based on the parallax information Z for the each pixel, distance information between the at least two imaging positions D, and a focal distance f which is a parameter of the imaging device, and the predetermined precision position calculating unit calculates a distance D' between the at least two imaging positions at which the measurement precision of the object satisfies a predetermined precision P' by equation (3) below based on a measurement distance H of the object and a focal distance f which is a parameter of the imaging device, or calculates a measurement distance H' of the object at which the measurement precision of the object satisfies the predetermined precision P' by a following equation (4) based on the distance between the at least two imaging positions D and the focal distance f which is the parameter of the imaging device, $$H = D \times f / Z \quad (1),$$

$$P' = H^2 / (D' \times f) \quad (3),$$

$$P' = H'^2 / (D \times f) \quad (4).$$

According to the present invention, it is possible to provide a machine control device for enhancing safety in a machine control device for controlling a machine based on an image of an object imaged by an imaging device.

BRIEF DESCRIPTION OF THE DRAWINGS

FIG. 4 is a diagram for explaining a calculation of two imaging positions (moving amounts) satisfying a target precision by the machine control device;

FIG. 5 is a diagram showing an example of a program for controlling the vision sensor by the machine control device (left portion) and explanations thereof (right portion);

DETAILED DESCRIPTION OF THE INVENTION

In the following, an example of an embodiment of the present invention will be described with reference to the attached drawings. It should be noted that the same reference symbols will be attached to identical or corresponding portions in the respective drawings.

First Embodiment

Figure 1:
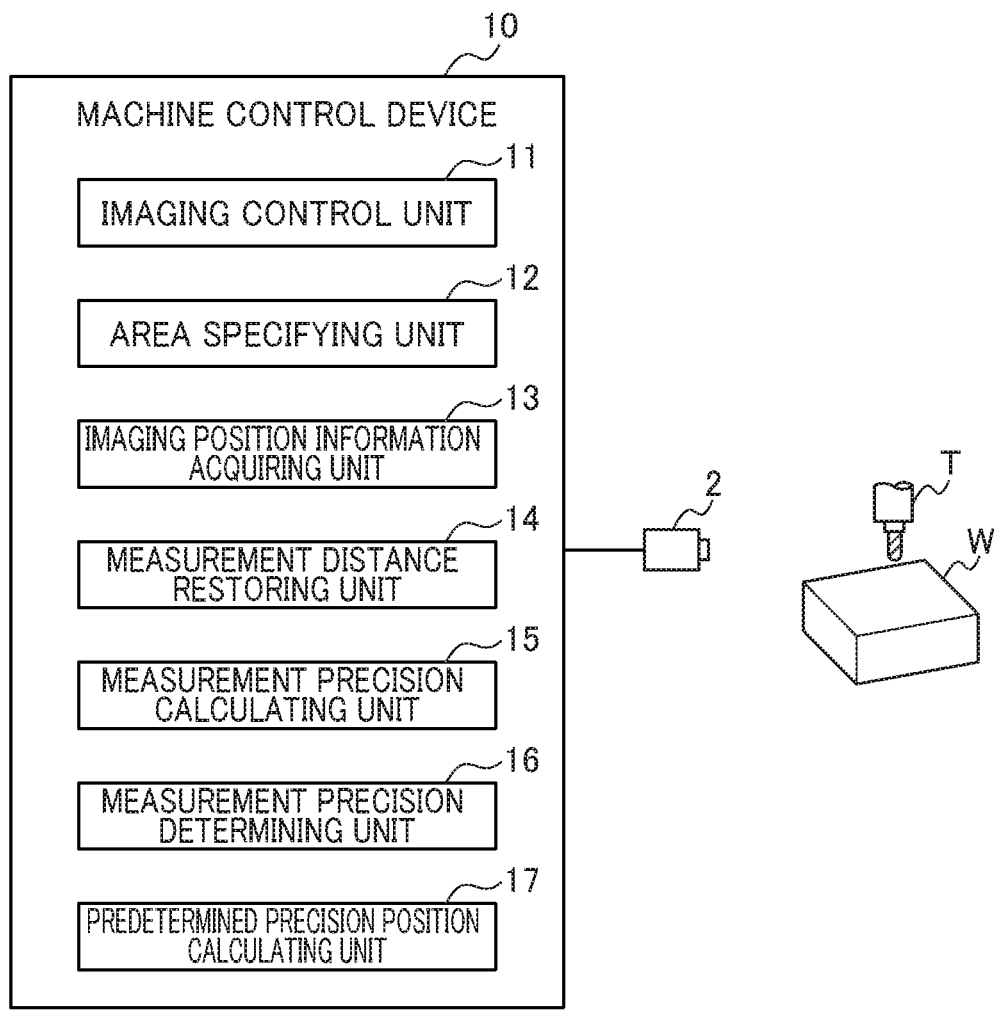
FIG. 1 is a diagram showing a main part of a machine control device of a machine tool according to a first embodiment as one embodiment of the present invention.

FIG. 1 is a diagram showing a main part of a machine control device of a machine tool according to a first embodiment as one embodiment. A machine control device 10 shown in FIG. 1 is a numerical control device that controls a machine tool for performing a predetermined operation (for example, machining such as cutting) on a workpiece (object) W. In such an operation, the machine control device 10 recognizes a position of the workpiece W based on an image including the workpiece W imaged by a vision sensor (visual sensor, imaging device) 2, and controls the relative position of a tool T and the workpiece W of the machine tool. For example, the machine control device 10 may control the position of the tool T of the machine tool, or alternatively, may control the position of the workpiece W. When the vision sensor 2 is mounted in the vicinity of the tool T of the machine tool, the movement command of the tool T of the machine tool and the movement command of the vision sensor 2 can be made identical. Hereinafter, the control of the vision sensor 2 by the machine control device 10 will be described in detail.

The machine control device 10 is configured by, for example, an arithmetic processor such as a CPU (Central Processing Unit) and a DSP (Digital Signal Processor). The various functions of the machine control device 10 are realized by executing predetermined software (programs, applications) stored in a storage unit, for example. The various functions of the machine control device 10 may be realized by the cooperation of hardware and software, or may be realized by only FPGA (Field Programmable Gate Array or hardware (electronic circuits)).

The machine control device 10 includes an imaging control unit 11, an area specifying unit 12, an imaging position information acquiring unit 13, a measurement distance restoring unit 14, a measurement precision calculating unit 15, a measurement precision determining unit 16, and a predetermined precision position calculating unit 17.

Figure 2:
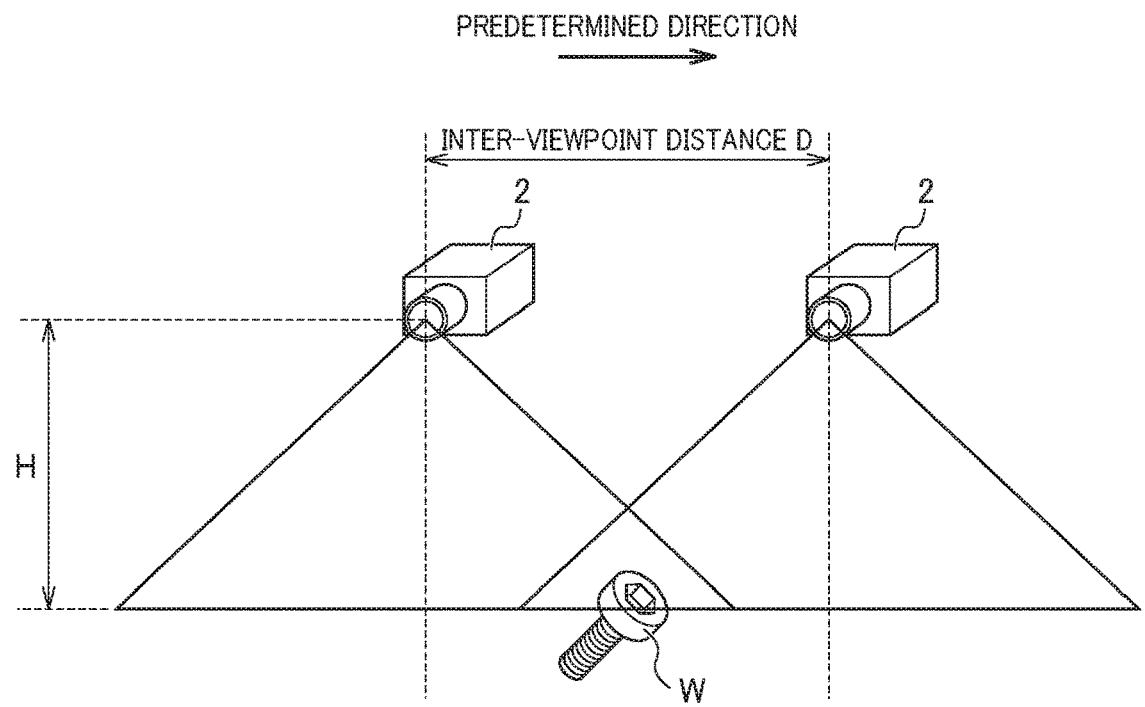
FIG. 2 is a diagram for explaining control of a vision sensor by the machine control device.

FIG. 2 is a diagram for explaining the control of the vision sensor 2 by the machine control device 10. As shown in FIG. 2, the imaging control unit 11 controls the position and orientation of the vision sensor 2, and controls the vision sensor 2 so as to capture two images including the workpiece W at two different imaging positions based on, for example, a control command stored in a storage unit (not shown). For example, the imaging control unit 11 causes the vision sensor 2 to move in a predetermined direction, and performs imaging of the workpiece W by the vision sensor 2 at two imaging positions of a distance between imaging positions D (hereinafter, also referred to as an inter-viewpoint distance)

In the two images, the area specifying unit 12 specifies a partial area of the workpiece W as a specified area (hereinafter, also referred to as a specified pixel or a pixel of interest). The specified area may be an area of a workpiece manually specified by the user based on a captured image displayed on the display unit or the like, or may be an area of a workpiece automatically specified by image processing of the captured image (for example, feature point extraction algorithms).

The imaging position information acquiring unit 13 acquires positional information of two imaging positions (for example, coordinates XYZ on the camera coordinate system or the machine coordinate system) from the above-described control command. It should be noted that the imaging position information acquiring unit 13 may acquire coordinates before and after the movement from the machine control device 10.

Figure 3:
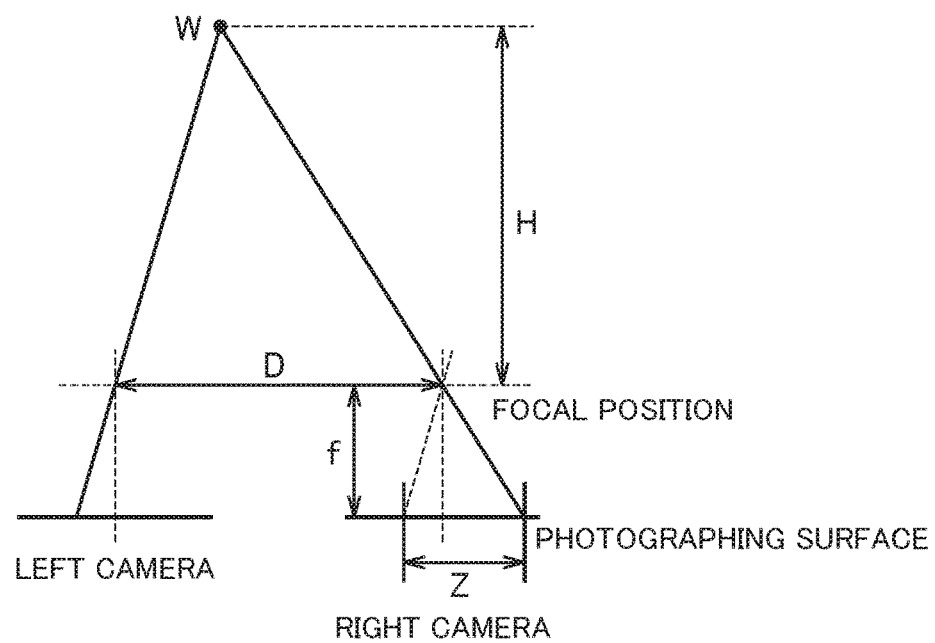
FIG. 3 is a diagram for explaining restoration of a measurement distance of a workpiece by using the stereo camera method.

The measurement distance restoring unit 14 restores the measurement distance of the workpiece W as the positional information of the workpiece W based on the two images, the distance information between the two imaging positions, and the parameters of the vision sensor 2 by using the stereo camera method. FIG. 3 is a diagram for explaining the restoration of the measurement distance of the workpiece by using the stereo camera method. As shown in FIG. 3, the measurement distance restoring unit 14 obtains the parallax Z for each pixel by performing area matching on the two images, and calculates the measurement distance H of the workpiece W by the following equation (1) based on the parallax Z for each pixel, the distance between the two imaging positions D, and the focal distance f which is a parameter of the vision sensor 2.

$$H = D \times f / Z \tag{1}$$

Here, the machine control device 10 recognizes the position of the workpiece W based on the image including the workpiece W imaged by the vision sensor 2, and controls the relative position between the tool T and the workpiece W of the machine tool.

Compared to the machining precision of the numerical control device of the machine tool, the measurement precision of the vision sensor 2 is lower. Therefore, if the information of the position and orientation of the workpiece W based on the image of the workpiece W captured by the vision sensor 2 is used for, for example, positioning the workpiece W without considering the measurement precision of the vision sensor 2, collision between the tool T and the workpiece W may occur, and the tool T or the workpiece W may be damaged. Therefore, the machine control device 10 of the present embodiment includes the measurement precision calculating unit 15, the measurement precision determining unit 16, and the predetermined precision position calculating unit 17, in addition to the measurement distance restoring unit 14.

The measurement precision calculating unit 15 calculates the measurement precision P of the measurement distance of the workpiece W based on the two images, the distance information between the two imaging positions, and the parameters of the vision sensor 2 by using the stereo camera method. The measurement precision P is defined by how much difference occurs when it is assumed that the workpiece W displayed on a photographing surface is erroneously displayed on the adjacent pixel (the parallax at this time is defined as Z') (refer to the following equation (2)). In other words, the measurement precision P is a value obtained by differentiating the measurement distance H by Z.

$$P = |H(Z') - H(Z)| = |dH/dZ| = D \times f / Z^2$$

The above equation (1) is substituted for this, and the measurement precision P is represented by the following equation (2).

$$P = H^2 / (D \times f) \tag{2}$$

From this, it can be understood that the measurement precision P is smaller as the distance between the two imaging positions D is larger, and thus, the precision is high.

The measurement precision determining unit 16 determines whether or not the measurement precision P of the workpiece W satisfies the target precision P' (predetermined precision, hereinafter, referred to as specified precision) in the specified area. The target precision P' may be a predetermined value, and may be stored in a storage unit or the like.

The predetermined precision position calculation unit 17 calculates two imaging positions at which the measurement precision P of the workpiece W satisfies the target precision P'. For example, the predetermined precision position calculating unit 17 calculates two imaging positions where the measurement precision P of the workpiece W satisfies the target precision P' based on the two images and the parameters of the vision sensor 2. More specifically, the predetermined precision position calculating unit 17 calculates distance information between two imaging positions at which the measurement precision of the workpiece W satisfies a predetermined precision based on the two images, the measurement distance of the workpiece W, and the parameters of the vision sensor 2 in the specified area.

FIG. 4 is a diagram for explaining the calculation of two imaging positions (moving amounts) satisfying the target precision P' by the machine control device 10. For example, the predetermined precision position calculating unit 17 calculates the distance between two imaging positions D' at which the measurement precision of the workpiece W satisfies the predetermined precision P' by the following equation (3) based on the measurement distance H of the workpiece W and the focal distance f which is a parameter of the imaging device.

$$P' = H^2 / (D' \times f) \tag{3}$$

Thus, the moving distance E from the state of the inter-viewpoint distance D is obtained by the following equation.

$$E = D' - D$$

Alternatively, the predetermined precision position calculating unit 17 may calculate the measurement distance of the workpiece W at which the measurement precision of the workpiece W satisfies a predetermined precision based on the two images, the distance information between the two imaging positions, and the parameters of the vision sensor 2 in the specified area. For example, the predetermined precision position calculating unit 17 may calculate the measurement distance H' of the workpiece W at which the measurement precision of the workpiece W satisfies the predetermined precision P' by the following equation (4) based on the distance between the two imaging positions D and the focal distance f which is a parameter of the vision sensor 2.

$$P' = H'^2 / (D \times f) \tag{4}$$

As described above, the measurement precision is improved by increasing the inter-viewpoint distance D. Alternatively, the measurement precision is improved by making the inter-viewpoint distance D constant and bringing the vision sensor 2 close to the workpiece W.

When the measurement precision of the workpiece W satisfies the target precision, the machine control device 10 controls the relative positions of the tool T and the workpiece W of the machine tool based on the position information of the workpiece W calculated by the position calculating unit 14, and performs a predetermined operation on the workpiece W by using the tool T.

On the other hand, when the measurement precision of the workpiece W does not satisfy the target precision, the machine control device 10 performs the following processing based on the two imaging positions satisfying the target precision P' calculated by the predetermined precision position calculating unit 17:

movement and capturing by the vision sensor 2 according to the imaging control unit 11;

calculation of the position of the workpiece W by the area specifying unit 12, the imaging position information acquiring unit 13, and the position calculating unit 14; and calculation and determination of the measurement precision of the workpiece W by the precision calculating unit 15 and the precision determining unit 16.

If the measurement precision of the workpiece W does not satisfy the target precision, the machine control device 10 may repeat the following processing until the target precision is obtained:

calculation of two imaging positions that satisfy the target precision P' by the predetermined precision position calculating unit 17;

movement and capturing by the vision sensor 2 according to the imaging control unit 11;

calculation of the position of the workpiece W by the area specifying unit 12, the imaging position information acquiring unit 13, and the position calculating unit 14; and calculation and determination of the measurement precision of the workpiece W by the precision calculating unit 15 and the precision determining unit 16.

When the target precision cannot be obtained even by repeating the above-described processing a predetermined number of times, or when it is difficult to move the vision sensor 2, the machine control device 10 stops the control of the relative positions of the tool T of the machine tool and the workpiece W based on the positional information of the workpiece W calculated by the position calculating unit 14 and the predetermined operation of the workpiece W by using the tool T.

FIG. 5 is a diagram showing an example of a program for controlling the vision sensor 2 by the machine control device 10 (left portion) and explanations thereof (right portion). "G800" is a movement command of the vision sensor. "G810" is a command for starting imaging and image processing (measurement of positional information and precision information). As a result, the imaging control unit 11 causes the vision sensor 2 to move in a predetermined direction, and performs imaging of the workpiece W by the vision sensor 2 at two imaging positions of the distance between imaging positions (inter-viewpoint distance) D. The imaging position information acquiring unit 13 acquires two imaging positions from the control command.

"G820" is a command for specifying a pixel of interest (specified area). As a result, the area specifying unit 12 specifies a partial area of the workpiece W as a specified area in the two images. The column and row of a specified pixel are entered as #100 and #101. The measurement distance restoring unit 14 restores the measurement distance of the workpiece W as the positional information of the workpiece W based on the two images, the distance information between the two imaging positions, and the parameters of the vision sensor 2 by using the stereo camera method. The measurement precision calculating unit 15 calculates the measurement precision of the measurement distance of the workpiece W based on the two images, the distance information between the two imaging positions, and the parameter of the vision sensor 2.

"G830" is a command for determining whether or not the positional information of the workpiece W corresponding to the pixel (#100, #101) satisfies (0.1, 0.1, 0.1) mm precision. As a result, the measurement precision determining unit 16 determines whether or not the measurement precision P of the workpiece W satisfies the target precision P' in the specified area. For example, the measurement precision determining unit 16 determines whether or not the measurement data of the pixel in the column #100 and the row #101 of the image satisfies the measurement precision (0.1, 0.1, 0.1) mm. For example, if not satisfied, a number other than 0 is entered in #8998.

"G840" is a command for calculating the imaging position required for the target pixel (specified area) to satisfy the specified precision (target precision). As a result, the predetermined precision position calculating unit 17 calculates two imaging positions at which the measurement precision P of the workpiece W satisfies the target precision P' (the distance between the two imaging positions D' or measurement distance H' of the workpiece W). For example, the predetermined precision position calculating unit 17 calculates the imaging position required for the measurement data of the pixel specified by the column #100 and the row #101 to satisfy the specified precision, and sets the next moving distance to X direction #300, Y direction #301, and Z direction #303.

The processing is returned to the second line by the "GOTO 10" command, and the vision sensor is moved once again to perform imaging.

As described above, according to the machine control device 10 of the present embodiment, it is possible to improve the measurement precision of the workpiece W, and to improve the security of the machine control device that controls the machine tool based on the image of the workpiece W captured by the vision sensor 2. Further, according to the machine control device 10 of the present embodiment, when erroneous measurement or inability to measure due to halation or occlusion occurs, it also functions effectively.

According to the inventors of the present application, the following knowledge is obtained.

Existing vision sensors cannot control the measurement precision.

Measurement precision can be improved by bringing the vision sensor close to the object; however, there are risks and limitations.

Sensors with high resolution elements, high precision lenses are expensive.

At present, there is no way for the numerical control device to determine the measurement precision of the vision sensor.

There is no way for numerical control device to know the measurement precision of the vision sensor.

There is no method for determining whether or not the precision required for machining is satisfied.

At present, there is no mechanism for the numerical control device to operate safely if the vision sensor lacks precision.

There is no mechanism for stopping the numerical control device from the vision sensor.

There is no mechanism for instructing to improve the precision of the vision sensor from the numerical control device.

In these respects, the following advantages can be obtained by the machine control device 10 of the present embodiment.

The numerical control device is able to know the measurement precision of the vision sensor.

The numerical control device makes it possible to determine whether or not the vision sensor output value satisfies the specified precision.

The numerical control device is able to control (improve) the measurement precision of the vision sensor.

If the measurement precision is insufficient, it is possible to stop the numerical control device.

Improvement of reliability

It is possible to guarantee the measurement precision of the vision sensor required for machining.

It is possible to use the vision sensors safely in numerical control device.

Improvement of detection precision

It is possible to improve the measurement precision of the vision sensor, and the detection precision can be improved.

Reduction in equipment cost

It is possible to achieve functions equivalent to stereo cameras with a numerical control device+monocular camera+control software (programs).

Modification Example

In FIG. 1, the machine control device 10 may not be provided with the predetermined precision position calculating unit 17. In other words, the machine control device 10 may not perform the calculation of the two imaging positions satisfying the target precision P' by the predetermined precision position calculating unit 17. In the modification example, when the measurement precision of the workpiece W does not satisfy the target precision, the machine control device 10 gradually widens the two imaging positions (for example, the distance between the two imaging positions D) until the target precision is obtained.

Figures 6, 7:
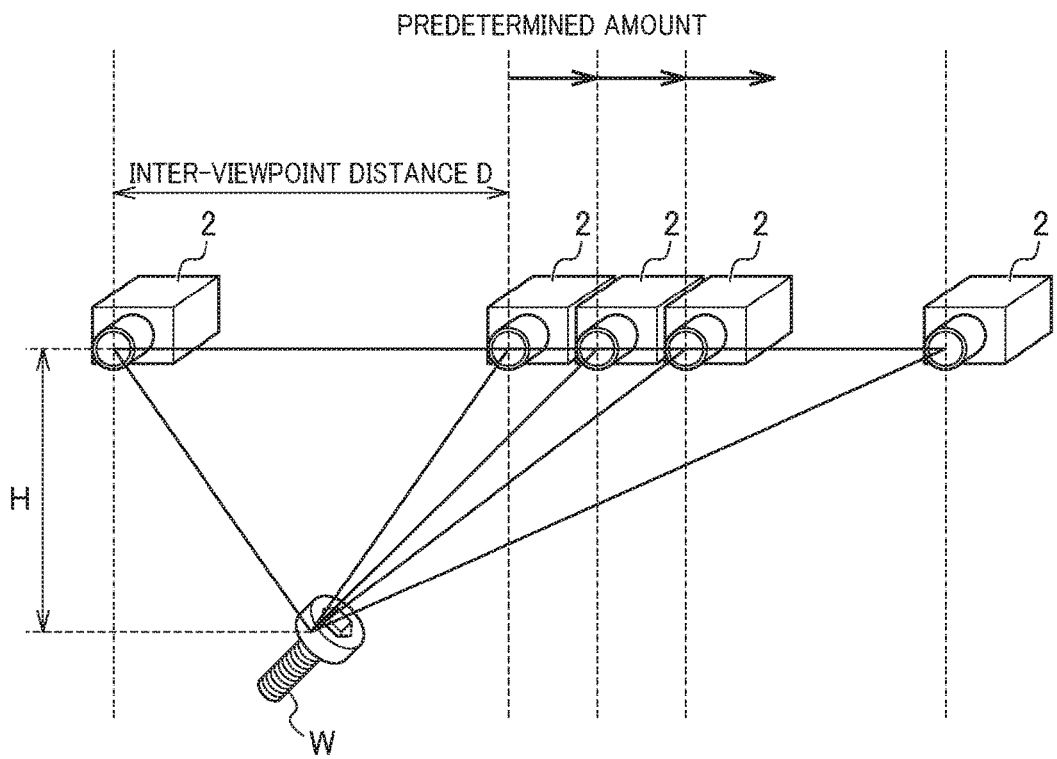
FIG. 6 is a diagram for explaining a calculation of two imaging positions (moving amounts) satisfying a target precision by the machine control device according to a modification example.
FIG. 7 is a diagram showing an example of a program for controlling the vision sensor by the machine control device according to a modification example (left portion) and explanations thereof (right portion).

FIG. 6 is a diagram for explaining a calculation of two imaging positions (moving amounts) satisfying the target precision by the machine control device 10 according to the modification example. As shown in FIG. 6, when the measurement precision of the workpiece W does not satisfy the target precision, the machine control device 10 according to the modification example widens the two imaging positions (for example, the distance between the two imaging positions D) by a predetermined amount (minute amount) until the target precision is obtained. The predetermined amount (minute amount) may be a predetermined amount and may be stored in, for example, a storage unit or the like. Alternatively, in the same manner as described above, the machine control device 10 according to the modification example may bring two imaging positions (for example, the measurement distance H of the workpiece W) close to the workpiece W by a predetermined amount (minute amount).

In other words, if the measurement precision of the workpiece W does not satisfy the target precision, the machine control device 10 of the modification example repeats the following processing until the target precision is obtained:

changing of the imaging position by a predetermined amount (minute amount);

movement and capturing by the vision sensor 2 according to the imaging control unit 11;

calculation of the position of the workpiece W by the area specifying unit 12, the imaging position information acquiring unit 13, and the position calculating unit 14; and calculation and determination of the measurement precision of the workpiece W by the precision calculating unit 15 and the precision determining unit 16.

FIG. 7 is a diagram showing an example of a program for controlling the vision sensor 2 by the machine control device 10 according to the modification example (left portion) and explanations thereof (right portion). The program shown in FIG. 7 differs in the position of the "G800" from the program shown in FIG. 5.

"G800" is a movement command of the vision sensor. For example, the vision sensor is moved in the X direction by a predetermined moving distance (for example, an initial value or a user specification) included in #200.

Although embodiments of the present invention have been described above, the present invention is not limited to the embodiments described above, and various modifications and variations are possible. For example, in the embodiment described above, the machine control device for measuring the position of an object based on an image including the object imaged by the vision sensor is exemplified; however, the present invention is not limited to this, and the present invention is applicable to a machine control device for measuring the position of an object based on an image including the object imaged by various imaging devices. Examples of such various imaging devices include a monocular camera, a stereo camera capable of three-dimensional measurement, and a three-dimensional camera. Even with the stereo cameras and three-dimensional cameras, the measurement precision can be improved by bringing them close to the object.

Further, in the embodiment described above, the machine control device for controlling the position with respect to the object based on two images including the object imaged at two imaging positions is exemplified; however, the present invention is not limited to this, and the present invention is applicable to a machine control device for controlling the position with respect to the object based on three or more images including the object imaged at three or more imaging positions. In this case, it may be configured to determine the imaging position as a reference, and, it may be configured, for each imaging position of the object, to restore the measurement distance of the object as the positional information of the object as described above (the measurement distance restoring unit), calculate the measurement precision of the measurement distance of the object (the measurement precision calculating unit), determine whether the measurement precision of the object satisfies a predetermined precision (the measurement precision determining unit), calculate the distance information between the two imaging positions or the measurement distance of the object at which the measurement precision of the object satisfies a predetermined precision (predetermined precision calculation unit), control the position and orientation of the imaging device based on the distance information between the two imaging positions or the measurement distance of the object calculated by the predetermined precision position calculating unit, and change the imaging position with respect to the reference (the distance between the two imaging positions or the measurement distance of the object).

Further, in the above-described embodiment, the numerical control device of the machine tool for performing a predetermined operation on a workpiece by controlling the relative position of a workpiece and a tool attached to the machine tool is exemplified. However, the present invention is not limited to this, and the present invention can be applied to various types of machine control devices such as a robot control device for performing a predetermined operation on a workpiece by controlling the relative positions of a workpiece and a tool or a hand attached to an industrial robot. In this case, when the imaging device is attached to the arm of the robot, the movement command of the arm of the robot and the movement command of the imaging device can be made identical.

EXPLANATION OF REFERENCE NUMERALS 2 vision sensor (imaging device)
10 machine control device 11 imaging control unit
12 area specifying unit
13 imaging position information acquiring unit
14 measurement distance restoring unit
15 measurement precision calculating unit
16 measurement precision determining unit
17 predetermined precision position calculating units

What is claimed is:

1. A machine control device that controls a machine performing a predetermined operation on a workpiece, the machine control device being configured to control a relative position of the machine and the workpiece based on an image including the workpiece imaged by an imaging device, the machine control device comprising:
 a memory storing a program; and
 a hardware controller configured to execute the program and control the machine control device to:
 control a position and orientation of the imaging device, and control the imaging device to capture two or more images including the workpiece at two or more different imaging positions based on a control command;
 acquire positional information of the two or more imaging positions;
 restore a measurement distance of the workpiece as positional information of the workpiece based on at least two images among the two or more images, distance information between at least two imaging positions corresponding to the at least two images among the two or more imaging positions, and a parameter of the imaging device, by using a stereo camera method;
 calculate a measurement precision of the measurement distance of the workpiece based on the at least two images, the distance information between the at least two imaging positions, and the parameter of the imaging device;
 specify a partial area of the workpiece as a specified area; and
 determine whether the measurement precision of the workpiece satisfies a predetermined precision in the specified area,
 wherein when the measurement precision of the workpiece satisfies the predetermined precision, the hardware controller is further configured to execute the program and control relative positions of a tool of the machine and the workpiece based on the position information of the workpiece calculated, and perform a predetermined operation on the workpiece by using the tool of the machine, and
 wherein the parallax information Z for each pixel is obtained by performing area matching on the at least two images, and a measurement distance H of the workpiece is calculated by equation (1) below based on the parallax information Z for the each pixel, distance information between the at least two imaging positions D, and a focal distance f which is the parameter of the imaging device, and
 a measurement precision P of the measurement distance of the workpiece is calculated by equation (2) below, which calculates a difference of the measurement distance H from an adjacent pixel by differentiating the measurement distance H by the parallax information Z, $$H = D \times f / Z \qquad (1),$$

$$P = |dH/dZ| = D \times f / Z^2 = H^2 / (D \times f) \qquad (2).$$

2. The machine control device according to claim 1, wherein when the measurement precision of the workpiece does not satisfy the predetermined precision, the machine control device stops control of the machine.

3. The machine control device according to claim 1, wherein when the measurement precision of the workpiece does not satisfy the predetermined precision, the machine control device controls the position and orientation of the imaging device and changes at least one of the at least two imaging positions so as to enhance the measurement precision of the workpiece.

4. The machine control device according to claim 3, wherein when the measurement precision of the workpiece does not satisfy the predetermined precision, the machine control device controls the position of the imaging device in a direction increasing a distance between the at least two imaging positions or in a direction bringing the imaging position close to the workpiece to thereby enhance the measurement precision of the workpiece.

5. The machine control device according to claim 3, wherein the hardware controller is configured to execute the program and control the machine control device to further:
 calculate distance information between the at least two imaging positions at which the measurement precision of the workpiece satisfies a predetermined precision based on the at least two images, the measurement distance of the workpiece, and the parameter of the imaging device, or calculate a measurement distance of the workpiece at which the measurement precision of the workpiece satisfies a predetermined precision based on the at least two images, the distance information between the at least two imaging positions, and the parameter of the imaging device in the specified area,
 wherein the machine control device controls the position and orientation of the imaging device based on the distance information between the at least two imaging positions or the measurement distance of the workpiece calculated, and changes at least one of the at least two imaging positions.

6. A machine control device that controls a machine performing a predetermined operation on a workpiece, the machine control device being configured to control a relative position of the machine and the workpiece based on an image including the workpiece imaged by an imaging device, the machine control device comprising:
 a memory storing a program; and
 a hardware controller configured to execute the program and control the machine control device to:
 control a position and orientation of the imaging device, and control the imaging device to capture two or more images including the workpiece at two or more different imaging positions based on a control command;
 acquire positional information of the two or more imaging positions;
 restore a measurement distance of the workpiece as positional information of the workpiece based on at least two images among the two or more images, distance information between at least two imaging positions corresponding to the at least two images among the two or more imaging positions, and a parameter of the imaging device, by using a stereo camera method;
 calculate a measurement precision of the measurement distance of the workpiece based on the at least two images, the distance information between the at least two imaging positions, and the parameter of the imaging device;

specify a partial area of the workpiece as a specified area; and
determine whether the measurement precision of the workpiece satisfies a predetermined precision in the specified area,
wherein when the measurement precision of the workpiece satisfies the predetermined precision, the hardware controller is further configured to execute the program and control relative positions of a tool of the machine and the workpiece based on the position information of the workpiece calculated, and perform a predetermined operation on the workpiece by using the tool of the machine, and
wherein parallax information Z for each pixel is obtained by performing area matching on the at least two images, and a measurement distance H of the workpiece is calculated by equation (1) below based on the parallax information Z for the each pixel, distance information between the at least two imaging positions D, and a focal distance f which is a parameter of the imaging device, and a distance D' between the at least two imaging positions at which the measurement precision of the workpiece satisfies a predetermined precision P' is calculated by equation (3) below based on a measurement distance H of the workpiece and a focal distance f which is a parameter of the imaging device, or a measurement distance H' of the workpiece at which the measurement precision of the workpiece satisfies the predetermined precision P' is calculated by a following equation (4) based on the distance between the at least two imaging positions D and the focal distance f which is the parameter of the imaging device, $$H = D \times f / Z \tag{1},$$

$$P' = H^2/(D' \times f) \tag{3},$$

$$P' = H'^2/(D \times f) \tag{4}.$$

* * * * *